(12) United States Patent
Schnapp et al.

(10) Patent No.: US 7,066,077 B2
(45) Date of Patent: Jun. 27, 2006

(54) DEVICE FOR SUPPORTING AND FOR AT LEAST CONTRIBUTING TO THE ACTIVATION OF AN ACTUATING ELEMENT

(75) Inventors: Peter Schnapp, Nuremberg (DE); Melanie Belatscheck, Wilhelmsdorf (DE)

(73) Assignee: Ina-Schaeffler KG (DE)

( * ) Notice: Subject to any disclaimer, the term of this patent is extended or adjusted under 35 U.S.C. 154(b) by 0 days.

(21) Appl. No.: 10/962,118

(22) Filed: Oct. 8, 2004

(65) Prior Publication Data

US 2005/0056145 A1    Mar. 17, 2005

Related U.S. Application Data

(63) Continuation of application No. PCT/EP03/02896, filed on Mar. 20, 2003.

(30) Foreign Application Priority Data

Apr. 11, 2002    (DE)    .................... 102 15 874

(51) Int. Cl.
*F16C 29/04* (2006.01)
(52) U.S. Cl. .......................... 92/178; 384/49
(58) Field of Classification Search ................ 92/178; 384/49
See application file for complete search history.

(56) References Cited

U.S. PATENT DOCUMENTS

| 4,544,212 A | * | 10/1985 | Parzefall et al. | ............... 384/49 |
| 5,375,932 A | * | 12/1994 | Hanaway | ..................... 384/49 |
| 5,707,153 A | * | 1/1998 | Steinberger et al. | .......... 384/49 |
| 6,402,382 B1 | * | 6/2002 | Schnapp et al. | ............... 384/49 |

FOREIGN PATENT DOCUMENTS

| DE | 3402523 C2 | 8/1985 |
| DE | 43 12 997 A1 | 4/1993 |
| DE | 195 80 454 C1 | 3/1995 |
| DE | 196 15 267 C2 | 4/1996 |
| DE | 197 25 226 A1 | 6/1997 |
| DE | 100 41 990 A1 | 8/2000 |
| EP | 1 164 316 A2 | 12/2001 |
| GB | 953145 | 3/1964 |

* cited by examiner

*Primary Examiner*—Thomas E. Lazo
(74) *Attorney, Agent, or Firm*—Ostrolenk, Faber, Gerb & Soffen, LLP

(57) ABSTRACT

A device for supporting and for at least contributing to the activation of an actuating element. An outer thin-walled bearing ring defines a pressure space to which pressure is applied. The outer thin-walled bearing ring at least partially bounds a circumference of the pressure space. A piston supports the actuating element and moves longitudinally within the pressure space with respect to the outer thin-walled bearing ring. Roller bodies configured to roll on the outer thin-walled bearing ring for supporting the actuating element.

8 Claims, 1 Drawing Sheet

DEVICE FOR SUPPORTING AND FOR AT LEAST CONTRIBUTING TO THE ACTIVATION OF AN ACTUATING ELEMENT

CROSS REFERENCE TO RELATED APPLICATION

This is a continuation of International Application No. PCT/EP03/02896, filed Mar. 20, 2003, published in the German language at WO 03/085291, which claims priority from German application No. 102 15 874.6 filed Apr. 11, 2002.

FIELD OF THE INVENTION

The invention relates to a device for supporting and for at least contributing to the activation of an actuating element. The actuating element is supported by at least one piston which can move longitudinally in a pressure space to which pressure is applied, and can be moved longitudinally in relation to a thin-walled bearing ring during a switching movement. The actuating element is supported on the bearing ring by roller bodies which roll on the bearing ring.

BACKGROUND OF THE INVENTION

An actuating element may, for example, be an actuating rail or actuating rod which acts on an actuating fork or on a sliding sleeve via the actuating fork. A piston drive is actuated by a hydraulic pressure medium or by compressed air. The piston drive generally has two pistons which interact with one another. In this context, the actuating element is slidably mounted with respect to a housing of a change speed gear mechanism in a longitudinal bonded fashion, movable alternately in one direction or the other, by the pistons which can longitudinally move in pressure spaces. In each case, a piston preferably engages at an end of the actuating rail or rod which points in the longitudinal direction. During an actuating movement of the actuating element, pressure is applied to one of the pressure spaces by the pressure medium so that the piston which bounds this pressure space generates a force on the actuating rail. The force is directed longitudinally with respect to the actuating movement, and either displaces the actuating element longitudinally or supports the displacement of the actuating element. The device can therefore be used in transmissions in which the actuating element is either exclusively activated using the pressure medium or for which activation is supported by the pressure medium. The device with power-assisted activation may be used in utility vehicles in which the manual gear shift operation is servo-supported.

European Patent No. 1 164 316 A2 discloses a generic device. A piston on an actuating rail has, at its outer circumference, a sealing element between the piston and a pressure space. That space is usually of cylindrical design. A sealing element is formed from at least one sealing lip of a seal which bears, at least temporarily, against the wall. In this context, the seal seals off the pressure space from the rest of the surroundings of the transmission in a pressure-tight fashion or with a low level of leakage. The pressure space is bounded on one side by the piston and has a variable size set by the stroke of the piston. The seal guides or supports the piston against the wall of the pressure space. With respect to transverse forces, the actuating element is supported by the wall of the pressure space by the pistons via the seal or seals. The seal is usually formed from plastic or rubber-elastic materials and is disadvantageously loaded by forces acting transversely with respect to the longitudinal movement of the piston. The pressure space is usually inadequately sealed and the piston or the seal wear prematurely.

European Patent EP 1 164 316 A2 discloses guiding actuating elements by bearing units which are free of play and which are composed of roller bodies and raceways, which are prestressed in a sprung fashion against the roller bodies. In such a bearing arrangement, the actuating element is usually supported in the transmission in an at least a linearly movable fashion by ball bearings. The roller bodies roll on raceways of thin-walled inner rings or outer rings. The rings are formed from sheet steel. When the bearing is installed, at least one of the bearing rings compensates both tolerances in the receptacle of the bearing in the housing of the transmission. These tolerances are caused by production and alignment errors of the centers of pressure spaces, which are opposite one another. The bearing ring also prestresses the roller bodies in the bearing without play. The actuating element is precisely guided by the bearing units in a manner that is free of play and low in friction. Previously, such a bearing arrangement has been considered disadvantageous owing to the considerable expenditure for equipment. For this reason, a guide section is positioned in front of the piston. The guide section guides the piston in the pressure space and supports the actuating rail in the pressure space. A lining of the pressure space is therefore not required. The cylinder bore which guides the piston is introduced directly into the lightweight metal housing of the transmission. This solution disadvantageously produces frictional forces at the longitudinally moved guide section, in addition to producing frictional forces arising from the moved seal. Alternating forces, which arise from uneven or excessively high friction, prevent a constant pressure buildup. This causes constant sliding at the actuating element and a constant actuation force at the sliding sleeve. This impedes precise control of the actuation in a manner which is dependent on the displacement or force/displacement. The pressure spaces which are formed in opposite walls of the transmission housing have to be aligned precisely with one another. Support deviation of the centers of the bores with respect to one another cause the guide sections to tilt and thus lead to higher frictional forces in the device. Furthermore, introduction of the bores for the pressure spaces into the walls of the transmission housing entails relatively high cost.

SUMMARY OF THE INVENTION

The object of the invention is to provide a device of this type with which the above-mentioned disadvantages are avoided.

In accordance with an exemplary embodiment of the present invention, this object is achieved in that a pressure space is at least partially bounded by an outer bearing ring of the bearing unit, which is supported on the housing. The piston is arranged in a longitudinally movable fashion in the outer bearing ring. The device has at least one bearing unit that supports the actuating element to be longitudinally movable and accommodates the pressure space and the piston for the longitudinal movement of the actuating element. Such movement is supported or driven by a pressure medium. The outer bearing ring (i.e., an outer ring) has at least one inner bearing face or raceways for the roller bodies. The outer bearing ring also bounds the pressure space, at least around its circumference. The outer bearing ring and a section of the ring are seated in a corresponding receptacle of the housing in the transmission. The thin-walled bearing ring partially or completely lines the receptacle of the housing. The pressure space is enclosed in a pressure-tight fashion around the circumference by the bearing ring. Alternatively, in accordance with another exemplary embodiment of the present invention, the bearing is not tight around the circumference, but rather the pressure space is closed off in a pressure-tight fashion around the circumference by the wall of the receptacle.

One of the longitudinal sides of the pressure space may also be closed by the base of an outer ring formed as a cup. The base of the cup and/or the cylindrical section of the outer bearing ring are advantageously provided with necessary openings through which the pressure medium passes into and out of the pressure space. The roller bodies may be supported and rolled on the inner lateral surface of the bearing ring, which may be formed as a cylinder. The inner lateral surface forms a longitudinal guide and may also form a sealing face for seating one or more of the pistons. The free inner diameter of the outer bearing ring in the pressure space is adapted to the necessary cross-sectional area of the piston to convert the pressure into a defined activation force at the actuating element. The free inner diameter in the movement range of the roller bodies may depend, for example, on the requisite basic load rating requirements and on the installation space. The installation space is necessary to accommodate the actuating element, the roller bearings and, if appropriate, a bearing cage and an inner bearing ring. The outer bearing ring is either provided on the inside in a stepped fashion with different diameters for the guidance of the piston/the pressure space up to the movement range of the roller bodies, or has the same cross section overall for all the sections. The length of the sleeve corresponds at least to the stroke of the piston and to the travel of the bearing of the actuating element, which may move longitudinally in synchronization with the piston.

The outer bearing ring may be formed as a drawn sheet metal part in the shape of a sleeve or cup. The necessary fine quality on the surface for guiding the piston/providing a seal and the roller bearing is better ensured either by appropriate selection of a starting material having a corresponding surface quality or by flow-turning and/or compacting the surface of the sheet metal during the drawing process. Fine processing, which involves cutting, is not necessary. The outer bearing ring may be manufactured cost effectively in large-scale production or mass production using relatively simple tools.

In one example embodiment of the present invention, the bearing unit has an inner bearing ring and an outer bearing ring. The inner bearing ring engages at least partially around the circumference of the actuating element. Transverse loads acting on the actuating element with respect to the longitudinal direction of the actuating element are supported by the inner bearing ring via the roller bodies on the outer bearing ring in the housing. The bearing or the bearing unit is positioned free of play by the inner bearing ring. The inner bearing ring is supported on the actuating element and elastically prestresses the roller bodies against the outer bearing ring in the radially outward direction.

One or two of the bearing units are usually seated with the inner bearing ring against one end of the actuating element and are supported in a receptacle of the transmission housing. Since such bearings are used to support the actuating element in a longitudinal movable fashion, raceways are usually formed in the inner bearing rings, which are also shaped from sheet metal without cutting. The bearing rings entirely or partially engage around the end of the actuating element in the circumferential direction. The roller bodies of the bearing unit, which may include ball bearings or cylindrical roller bodies, are often housed and guided in a cage. The cage is formed either from plastic or from sheet metal, and partially or entirely engages around or over the inner bearing ring. These bearing rings often have a non-circular cross section and are thus matched to the cross section, for example, a rectangular cross section, of the rod on the seat of the bearing unit. Such a bearing is embodied without play, that is, the actuating element is supported without radial air in the housing of the bearing. For this purpose, the bearing unit is inherently prestressed by an elastically prestressed and spring-deflected bearing ring provided at least in the rolling region of the rolling bearings. The inner bearing ring is punched or cut in one part from a relatively thin-walled piece of sheet metal and then shaped by bending or bordering. The bearing ring engages around the circumference of the actuating element and is opened at a slit on its side. The cross section of the bearing ring is matched to the cross section of the actuating element (which is usually a rectangular cross section) at the seat of the bearing unit. The bearing ring is supported by inwardly projecting supports on the surface of the actuating element. These supports are formed as tabs and are shaped from sheet metal. Ball bearings may extend in the raceways, which are formed on the bearing ring and are guided in pairs within a pocket of a cage. Three of the pockets are formed on the circumference of the cage. Alternatively, the cage may have a continuous ball bearing guideway in which the ball bearings circulate endlessly.

The device, which is composed of the outer bearing ring, the inner bearing ring, the roller bodies, a cage (if appropriate) and the piston, may be pre-mounted as a mounting unit. In this manner, the equipment expense may be reduced to a minimum. The elastically resilient inner ring in the bearing unit compensates alignment errors of the centers of receptacles for the bearing unit which lie opposite one another in the transmission housing. Fabrication expense for forming the receptacles in the transmission housing is therefore reduced. The piston within the outer bearing ring is free of radial loading forces on the actuating element and is guided precisely in the outer bearing ring. Frictional losses caused by uneven loading of the piston from transverse forces acting on the actuating element and thus fluctuations in the build-up of pressure are avoided. The receptacles in the transmission housing may be manufactured with relatively large tolerances. Fine processing of the receptacles is not required since the piston is guided in the outer bearing ring and bears, if appropriate, with a seal against the wall of the outer bearing ring.

Other features and advantages of the present invention will become apparent from the following description of the invention which refers to the accompanying drawings.

DETAILED DESCRIPTION OF PREFERRED EMBODIMENTS

Figure 1:
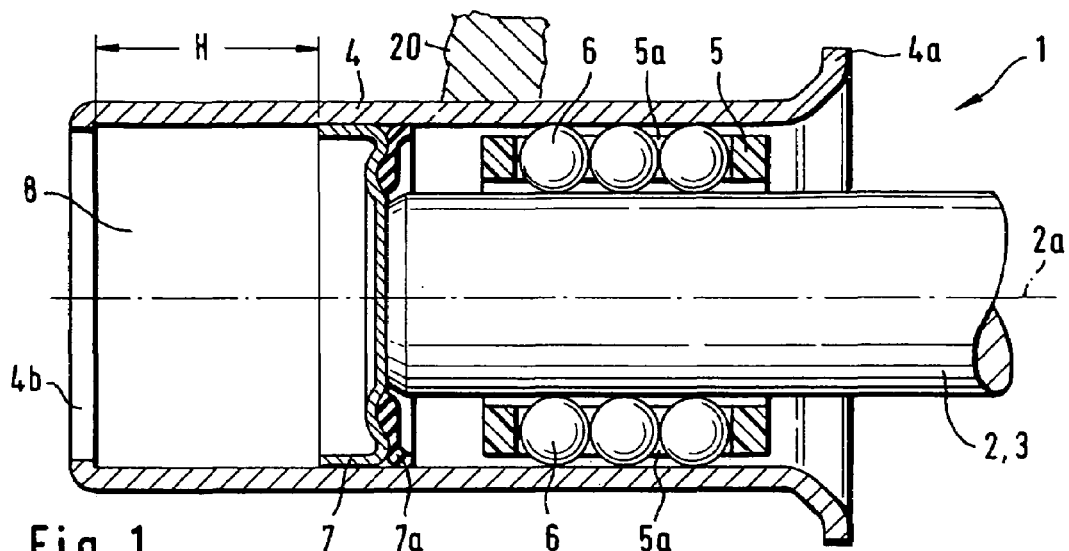
FIG. 1 shows an exemplary embodiment of a device according to the present invention.

FIG. 1 shows an exemplary embodiment of a device 1 for supporting and at least contributing to the activation of an actuating element 2 according to the present invention. The actuating element 2 is shown as an actuating shaft 3. Roller bodies 6 in the form of ball bearings are guided by a cage 5. The roller bodies 6 and a piston 7 are accommodated in an outer bearing ring 4. The outer bearing ring 4 bounds a pressure space 8 at the circumference. The piston 7 bounds the pressure space 8 with respect to the actuating shaft 3 and is guided in a longitudinally moveable fashion in the outer bearing ring 4. The piston is shaped from sheet metal without cutting. The outer ring of the device is seated in the housing 20 of a gear speed change mechanism.

A seal 7*a* is attached to the piston. The seal 7*a* bears around the outer bearing ring 4. The roller bodies 6 in the outer bearing ring 4 support the actuating element 2 against forces directed transversely with respect to the longitudinal axis 2*a* of the actuating element 2. The cage 5 has a plurality of pockets arranged on the circumference of the actuating shaft 3. Each pocket guides one ore more roller bodies 6. The outer bearing ring 4 is drawn in the shape of a sleeve from a thin-walled piece of sheet metal, and has a cylindrical cross section. A centering collar 4*a* on the outer bearing ring 4 facilitates the mounting of the piston 7 and of the cage 5 with the roller bodies 6 in the outer bearing ring 4.

The pressure space 8 is filled with a pressure medium (not shown) through an opening 4*b* on the side of the outer bearing ring 4 facing away from the centering collar 4*a*. The pressure medium may include, for example, air or a hydraulic fluid (e.g., transmission oil). The piston 7, to which pressure is applied, moves in the direction of the centering collar 4*a*. In this manner, the piston 7 displaces the actuating shaft 3 in the longitudinal direction. The actuating shaft 3 is supported on the outer bearing ring 4 by the roller bodies 6, which roll on the cylindrical internal surface of the outer bearing ring 4. Referring to FIG. 1, the piston 7 is illustrated in a position at which the maximum extent of the stroke H of the piston 7 has been reached. From this position, the piston 7 is displaced longitudinally by the actuating shaft 3 in the opposite direction (i.e., in the direction of the opening 4*b*). The actuating shaft 3 may be actuated, for example, by another device according to the invention (not illustrated) located at the other end of the actuating shaft.

Figure 2:
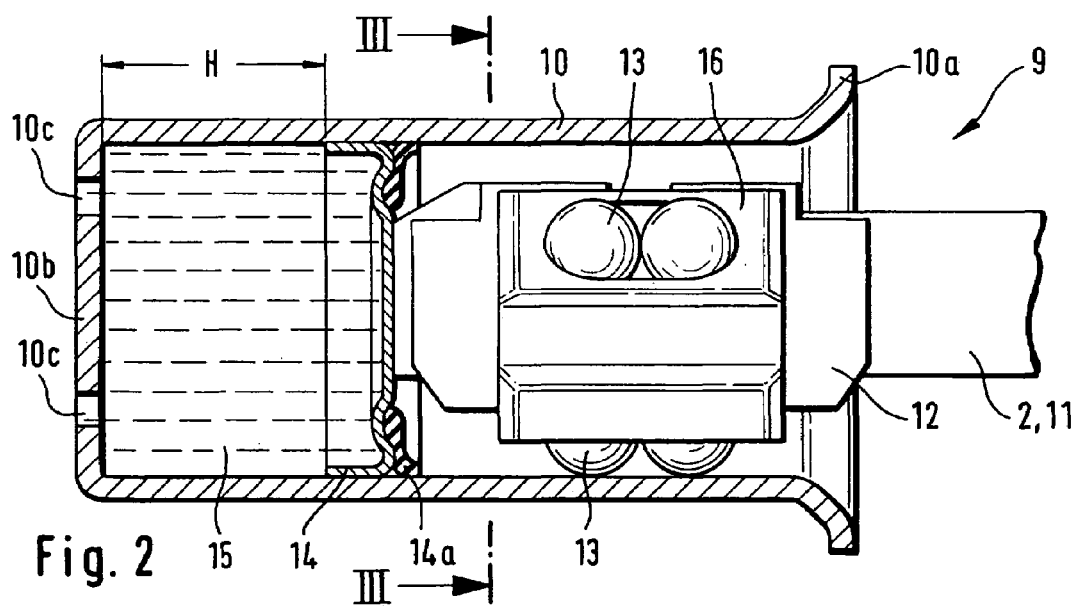
FIG. 2 shows another exemplary embodiment of a device according to the present invention.

FIG. 2 shows another exemplary embodiment of a device 9 according to the present invention. A longitudinally movable actuating element 2 is accommodated in an outer bearing ring 10. The actuating element 2 is an actuating rail 11 supported on the element 2 by an inner bearing ring 12 and on the outer bearing ring 10 by the roller bodies 13. The roller bodies 13 are guided in a cage 16. In addition, a longitudinally movable piston 14 is guided in the outer bearing ring 10. The outer bearing ring 10 is a drawn part made of sheet metal formed as a cylindrical cup. A centering collar 10*a* facilitates the mounting of the individual parts to form one unit. A pressure space 15 is bounded with respect to the actuating rail 11 by the piston 14. A seal 14*a*, which spans an annular gap between the piston 14 and the outer bearing ring 10, is attached to the piston 14. The pressure space is closed off on one side by the base 10*b* of the bearing ring 10. The base 10*b* has one or more inlet or outlet openings 10*c* for a hydraulic fluid (e.g., transmission oil). The piston 14, to which pressure is applied by the hydraulic fluid, moves in the direction of the centering collar 10*a*. In this manner, the piston 14 longitudinally displaces the actuating rail 11. Referring to FIG. 2, the piston 14 is illustrated in a position at which the maximum extent stroke H has been reached by the piston 14. From this position, the piston 14 may be moved longitudinally in the opposite direction by the actuating rail 11. In this manner, the piston displaces the hydraulic fluid out of the pressure space 15.

Figure 3:
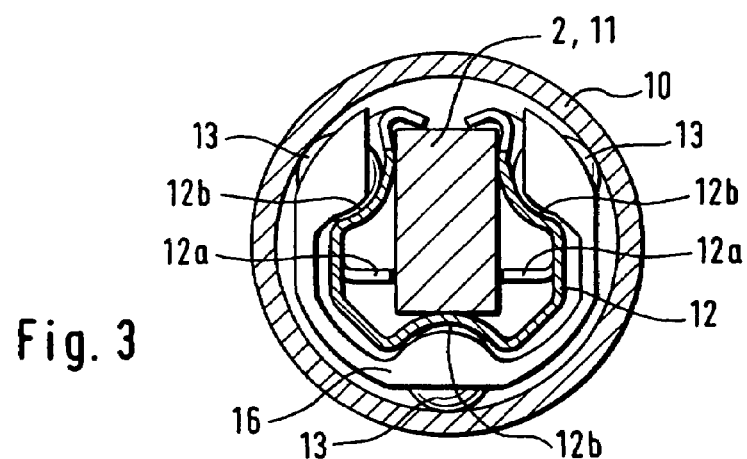
FIG. 3 shows a sectional view along line III—III of the device illustrated in FIG. 2.

FIG. 3 illustrates a sectional view through the device 9. The actuating rail 11 has a rectangular cross section at least at its end. The inner bearing ring 12 is formed from sheet metal and is slotted at its upper side and thus engages partially around the actuating rail 11 in the circumferential direction. Supports 12*a*, which bear against the actuating rail 11, are bent out of the sheet metal of the inner bearing ring 12. Raceways 12*b* are formed in the inner bearing ring 12. The raceways 12*b* are configured in an elastically resilient fashion and each prestresses a series of roller bodies 13 against the outer bearing ring 10. The inner bearing ring 12 is supported on the actuating rail 11. The supports 12*a* stabilize the arrangement. The roller bodies 13 are ball bearings. The cage 16 is slotted in the longitudinal direction to facilitate a simple mounting on the inner bearing ring 12. The arrangement of the bearing unit is free of play.

What is claimed is:

1. A device for supporting and for at least contributing to the activation of an actuating element, the device comprising:
   a housing of a change speed gear mechanism;
   an actuating element having an end and being longitudinally movably mounted with respect to the housing of the change speed gear mechanism;
   an outer thin-walled bearing ring supported in the housing of the change speed gear mechanism and defining and at least partially bounding a circumference in which the actuating element is supported;
   a pressure space to which pressure may be applied, the pressure space is at the end of the actuating element;
   a piston for engaging the end of the actuating element and configured to move longitudinally within the pressure space with respect to the outer thin-walled bearing ring and to which pressure is applied by a medium in the pressure space; and
   roller bodies positioned to roll on the outer thin-walled bearing ring and for supporting the actuating element.

2. The device of claim 1, wherein the outer thin-walled bearing ring is cylindrically sleeve-shaped and continuously bounds the circumference of the pressure space and the piston is guided for longitudinal movement by the outer bearing ring.

3. The device of claim 1, wherein the pressure applied to the pressure space is generated by the medium comprising a hydraulic fluid, the device further comprising:
   a seal on the piston bearing at least temporarily against the entire circumference of the outer thin-walled bearing ring.

4. An assembly, comprising:
   two of the devices as recited in claim 1 on one of the activating elements, the actuating element being an actuating shaft that is longitudinally movable in a first direction by a first one of the devices and longitudinally movable in a second direction opposite to the first direction by a second one of the devices.

5. The assembly of claim 4, wherein the pressure applied to the pressure spaces of the first and second devices is applied by a hydraulic fluid, the pressure being alternatively applied to the pressure spaces to longitudinally move the actuating shaft in the first and second directions, respectively, the piston of the first device being so positioned with reference to the actuating element for generating a force on the actuating shaft during the switching movement of the first device to longitudinally move the actuating shaft in the first direction, the piston of the second device being so positioned with reference to the actuating element for generating a force on the actuating shaft during the switching movement of the second device to longitudinally move the actuating shaft in the second direction.

6. A device for supporting and for at least contributing to the activation of an actuating element, the device comprising:
- an actuating element having an end and an outer circumference;
- an outer thin-walled bearing ring defining and at least partially bounding a circumference in which the actuating element is supported;
- a pressure space to which pressure may be applied, the pressure space is at the end of the actuating element;
- a piston for engaging the end of the actuating element and configured to move longitudinally within the pressure space with respect to the outer thin-walled bearing ring and to which pressure is applied by a medium in the pressure space;
- roller bodies positioned to roll on the outer thin-walled bearing ring and for supporting the actuating element; and
- an inner bearing ring at least partially engaging the actuating element at the outer circumference thereof,
- the inner bearing ring elastically pre-stressing the roller bodies radially against the outer thin-walled bearing ring without play, the roller bodies supporting the inner bearing ring on the outer thin-walled bearing ring.

7. The device of claim 6, further comprising:
- the actuating element includes an end having a rectangular cross section, and the inner bearing ring at least partially surrounds the actuating element at the end of the actuating element having the rectangular cross section, the device further comprising:
- at least three longitudinally extending raceways on the inner bearing ring for accommodating the roller bodies.

8. A device for supporting and for at least contributing to the activation of an actuating element, the device comprising:
- an actuating element having an end;
- an outer thin-walled bearing ring defining and at least partially bounding a circumference in which the actuating element is supported;
- a pressure space to which pressure may be applied, the pressure space is at the end of the actuating element;
- a piston for engaging the end of the actuating element and configured to move longitudinally within the pressure space with respect to the outer thin-walled bearing ring and to which pressure is applied by a medium in the pressure space; and
- roller bodies positioned to roll on the outer thin-walled bearing ring and for supporting the actuating element;
- wherein the pressure space has a longitudinal side, the outer thin-walled bearing ring is cylindrical with a cup-shape including a sidewall and a base, the sidewall of the outer thin-walled bearing ring radially bounds the circumference of the pressure space, and the base of the thin-walled bearing ring bounds an outward longitudinal side of the pressure space.

* * * * *